(12) United States Patent
Choi et al.

(10) Patent No.: US 11,122,147 B2
(45) Date of Patent: Sep. 14, 2021

(54) DONGLE AND CONTROL METHOD THEREFOR

(71) Applicant: Samsung Electronics Co., Ltd., Suwon-si (KR)

(72) Inventors: One-seok Choi, Suwon-si (KR); Jae-hwan Go, Suwon-si (KR); Hyung-ryoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 16/073,633

(22) PCT Filed: Feb. 22, 2017

(86) PCT No.: PCT/KR2017/001961
§ 371 (c)(1),
(2) Date: Jul. 27, 2018

(87) PCT Pub. No.: WO2017/146469
PCT Pub. Date: Aug. 31, 2017

(65) Prior Publication Data
US 2019/0089813 A1  Mar. 21, 2019

(30) Foreign Application Priority Data
Feb. 22, 2016 (KR) .................. 10-2016-0020532

(51) Int. Cl.
*H04L 29/08* (2006.01)
*H04L 12/28* (2006.01)
(Continued)

(52) U.S. Cl.
CPC .............. *H04L 67/34* (2013.01); *G06F 21/44* (2013.01); *H04L 12/2818* (2013.01);
(Continued)

(58) Field of Classification Search
CPC ................................................ G08C 2201/93
See application file for complete search history.

(56) References Cited

U.S. PATENT DOCUMENTS 8,078,732 B2   12/2011   Jo
8,149,095 B2   4/2012    Hayashi et al.
(Continued)

FOREIGN PATENT DOCUMENTS

CN   101394448 A   3/2009
CN   102722393 A   10/2012
(Continued)

OTHER PUBLICATIONS

"Blackhawk USB510W Wireless JTAG Emulator Datasheet", Blackhawk-DSP website, Sep. 30, 2011 [retrieved on Jul. 18, 2020], Retrieved from the Internet: <URL: https://www.blackhawk-dsp.com/downloads/docs/datasheets/USB510W-DS-01LR.pdf>. (Year: 2011).*

(Continued)

*Primary Examiner* — Kevin T Bates
*Assistant Examiner* — Dae Kim

(57) ABSTRACT

A dongle for relaying communication is disclosed. The dongle according to one embodiment of the present disclosure comprises: a first communication interface for wireless communication; a second communication interface for communication with a device; and a processor for controlling the first communication interface to download, from a server, a control program for controlling a device on the basis of identification information of the device received from the device, and controlling a second communication interface to output a control signal for controlling the device, using the downloaded control program.

9 Claims, 15 Drawing Sheets

(51) Int. Cl.
*H04W 48/14* (2009.01)
*H04W 88/06* (2009.01)
*H04L 29/06* (2006.01)
*G06F 21/44* (2013.01)
*H04W 48/10* (2009.01)

(52) U.S. Cl.
CPC .............. *H04L 29/06* (2013.01); *H04L 29/08* (2013.01); *H04L 67/125* (2013.01); *H04W 48/10* (2013.01); *H04W 48/14* (2013.01); *H04W 88/06* (2013.01)

(56) References Cited

U.S. PATENT DOCUMENTS

| | | | |
|---|---|---|---|
| 9,083,547 B2 | 7/2015 | Lim et al. | |
| 2003/0228911 A1 | 12/2003 | Dernis et al. | |
| 2004/0244008 A1* | 12/2004 | Lee | G06F 8/20 |
| | | | 719/310 |
| 2008/0125912 A1* | 5/2008 | Heilman | D06F 39/005 |
| | | | 700/275 |
| 2008/0130520 A1* | 6/2008 | Ebrom | H04L 12/2825 |
| | | | 370/254 |
| 2009/0017798 A1* | 1/2009 | Pop | H04W 4/029 |
| | | | 455/414.1 |
| 2009/0055536 A1 | 2/2009 | Jo | |
| 2009/0072991 A1 | 3/2009 | Hayashi et al. | |
| 2011/0264245 A1 | 10/2011 | Lim et al. | |
| 2012/0316662 A1 | 12/2012 | Huh et al. | |
| 2013/0051215 A1* | 2/2013 | Kim | H04L 69/40 |
| | | | 370/216 |
| 2014/0089671 A1* | 3/2014 | Logue | H04L 63/0884 |
| | | | 713/182 |
| 2014/0294382 A1* | 10/2014 | Lee | H04B 10/1141 |
| | | | 398/43 |
| 2014/0295762 A1* | 10/2014 | Jung | H04W 48/16 |
| | | | 455/41.2 |
| 2014/0341585 A1* | 11/2014 | Lee | G08C 17/02 |
| | | | 398/106 |
| 2015/0237493 A1* | 8/2015 | Won | H04L 41/22 |
| | | | 715/734 |
| 2015/0295763 A1 | 10/2015 | Yu et al. | |
| 2015/0373390 A1 | 12/2015 | Park | |
| 2016/0135241 A1* | 5/2016 | Gujral | H04L 67/12 |
| | | | 370/328 |
| 2016/0211985 A1* | 7/2016 | Castillo | H04L 12/2825 |
| 2017/0006656 A1* | 1/2017 | Nacer | H04W 8/06 |

FOREIGN PATENT DOCUMENTS

| | | |
|---|---|---|
| CN | 103312760 A | 9/2013 |
| CN | 105338554 A | 2/2016 |
| JP | 2004-008799 A | 1/2004 |
| JP | 2008-244941 A | 10/2008 |
| KR | 10-2006-0053251 A | 5/2006 |
| KR | 10-0917922 B1 | 9/2009 |
| KR | 10-1090476 B1 | 12/2011 |
| KR | 10-2012-0009947 A | 2/2012 |
| KR | 10-2012-0128373 A | 11/2012 |
| KR | 10-2013-0137490 A | 12/2013 |
| KR | 10-2014-0135433 A | 11/2014 |
| KR | 10-1582801 B1 | 1/2016 |

OTHER PUBLICATIONS

European Patent Office, "Supplementary European Search Report," Application No. EP17756807.8, dated Oct. 30, 2018, 9 pages.
Tepper, Fitz, "Tado's Smart AC Control Makes Any Air Conditioner Smart," TechCrunch, Jun. 4, 2015, 4 pages.
ISA/KR, "International Search Report and Written Opinion of the International Searching Authority," International Application No. PCT/KR2017/001961, dated May 25, 2017, 13 pages.
Office Action dated Jul. 27, 2020 in connection with Chinese Patent Application No. 201780012846.9, 21 pages.
The Second Office Action dated Mar. 31, 2021 in connection with Chinese Application No. 201780012846.9, 18 pages.

\* cited by examiner

DONGLE AND CONTROL METHOD THEREFOR

CROSS-REFERENCE TO RELATED APPLICATIONS AND CLAIM OF PRIORITY

This application is a 371 National Stage of International Application No. PCT/KR2017/001961 filed Feb. 22, 2017, which claims priority to Korean Patent Application No. KR 10-2016-0020532 filed Feb. 22, 2016, the disclosures of which are herein incorporated by reference in their entirety.

BACKGROUND

1. Field

The present disclosure relates to a dongle and a control method therefor, and more particularly, to a dongle which downloads a program corresponding to a connected device and provides a function capable of controlling the connected device, and a control method therefor.

2. Description of Related Art

In recent years, most electronic devices expand functions thereof by using a network communication.

In particular, the advancement of Internet of Things (IoT) construct a network between devices being used in the house to thereby provide a more convenient and useful service. For example, the user may access a home network constructed in the house via a personal mobile terminal and manage and control household devices.

Meanwhile, the dongle is a device for providing a communication function to a device not supporting wireless communication. That is, the dongle is an electronic module relaying communication between a device and an Internet network. The manufacturers have attempted to connect a device not directly supporting the Internet of Things (IoT) function to a home network.

In related art, the dongle has been fixedly manufactured to suit the intended purpose and the target product. In detail, the dongle is manufactured with a program to support the target product according to the target product connected and to which the wireless communication is to be provided.

The dongle is not universal, and even if a plurality of programs for various target products are included therein, a spatial limitation of a memory in a small dongle is present. Also, there is a problem that it is necessary to manufacture a new dongle for a new product.

SUMMARY

The present disclosure is a technical idea invented from the perspective described above. The present disclosure is to provide a dongle providing a function capable downloading a program corresponding to a connected device and controlling the connected device, and a control method therefor.

According to an aspect of the present disclosure, there is provided a dongle for relaying communication, comprising: a first communication interface for wireless communication; a second communication interface for communication with a device; and a processor for controlling the first communication interface to download, from a server, a control program for controlling the device on the basis of identification information of the device received from the device, and controlling a second communication interface to output a control signal for controlling the device, using the downloaded control program.

The processor may convert, through the first communication interface, a command signal received from an electronic device connected to a home network to the control signal for controlling the device using the downloaded control program, and control the second communication interface to output the converted control signal.

The received command signal may be a signal of a command generated according to a predefined protocol for interlocking the device with another device included in the home network.

The processor may identify a type of the device based on the received identification information, and controls the first communication interface to download a control program corresponding to the determined device type from the server.

The processor may, based on the type of the device not being identified based on the received identification information, transmit the received identification information to the server to search for a control program corresponding to the device, and control the first communication interface to download the found control program from the server.

The processor may broadcast an advertisement signal including the received identification information, receives Access Point (AP) information from an external device connected to the dongle using the advertisement signal, connect to an AP using the received AP information, and control the first communication interface to download the control program from the server via the connected AP.

The wireless communication may be a Wi-Fi communication. The identification information of the device may be written in an American Standard Code for Information Interchange (ASCII) code. The processor may control the first communication interface to broadcast the advertisement signal including the received identification information in a Service Set Identifier (SSID) field.

The processor may broadcast an advertisement signal including the received identification information, receive Access Point (AP) information and the control program from an external device connected to the dongle using the advertisement signal, and control the first communication interface to connect with an AP using the received AP information.

According to an aspect of the present disclosure, there is provided a method for controlling a dongle for relaying communication, the method comprising: receiving from a connected device, identification information of the device; downloading, from a server, a control program for controlling the device based on the received identification information; and outputting a control signal for controlling the device to the device, using the downloaded control program.

The method may further include receiving a command signal from an electronic device connected to a home network. The outputting may include converting the received command signal to the control signal for controlling the device using the downloaded control program, and outputting the converted control signal to the device.

The received command signal may be a signal of a command generated according to a predefined protocol for interlocking the device with another device included in the home network.

The downloading may include identifying a type of the device based on the received identification information, and downloading, from the server, the control program corresponding to the determined device type.

The downloading may include, based on a type of the device not being identified based on the received identification information, transmitting, to the server, the received identification information to search for a control program corresponding to the device, and downloading the found control program from the server.

The method may further include broadcasting an advertisement signal including the received identification information, receiving Access Point (AP) information from an external device connected to the dongle, using the advertisement signal, and connecting to an AP using the received AP information. The downloading may include downloading the control program from the server via the connected AP.

The dongle may support wireless communication using Wi-Fi. The received identification information may be written in an American Standard Code for Information Interchange (ASCII) code. The broadcasting may include broadcasting the advertisement signal including the received identification information in a Service Set Identifier (SSID) field.

The method may further include broadcasting an advertisement signal including the received identification information, receiving Access Point (AP) information from an external device connected to the dongle, using the advertisement signal, and connecting to an AP using the received AP information. The downloading may include receiving the control program from the external device connected to the dongle.

According to the various example embodiments, the dongle and control method according to an example embodiment may achieve the effect as shown below.

It is not necessary that the user purchases a new dongle for each product, and the manufacturer may reduce the cost of production.

The manufacturer may diversify a model of a newly-launched product according to performances, and the user may be provided with an option for the IoT function via the dongle.

Even if a plurality of devices of different manufacturers are present on a home network, the devices may be interlockedly controlled by one predetermined communication protocol.

DETAILED DESCRIPTION

Hereinafter, exemplary embodiments of the present disclosure will be described in detail with reference to the accompanying drawings. Also, well-known functions or constructions are not described in detail since they would obscure the disclosure with unnecessary detail. The terms used in the exemplary embodiments of the present disclosure have been defined in consideration of the functions of the present disclosure, and they may vary depending on users, operators or precedents. Therefore, the terms used in the exemplary embodiments should be defined based on the meaning thereof and the descriptions of the present disclosure, rather than based on their names only.

Figure 1A:
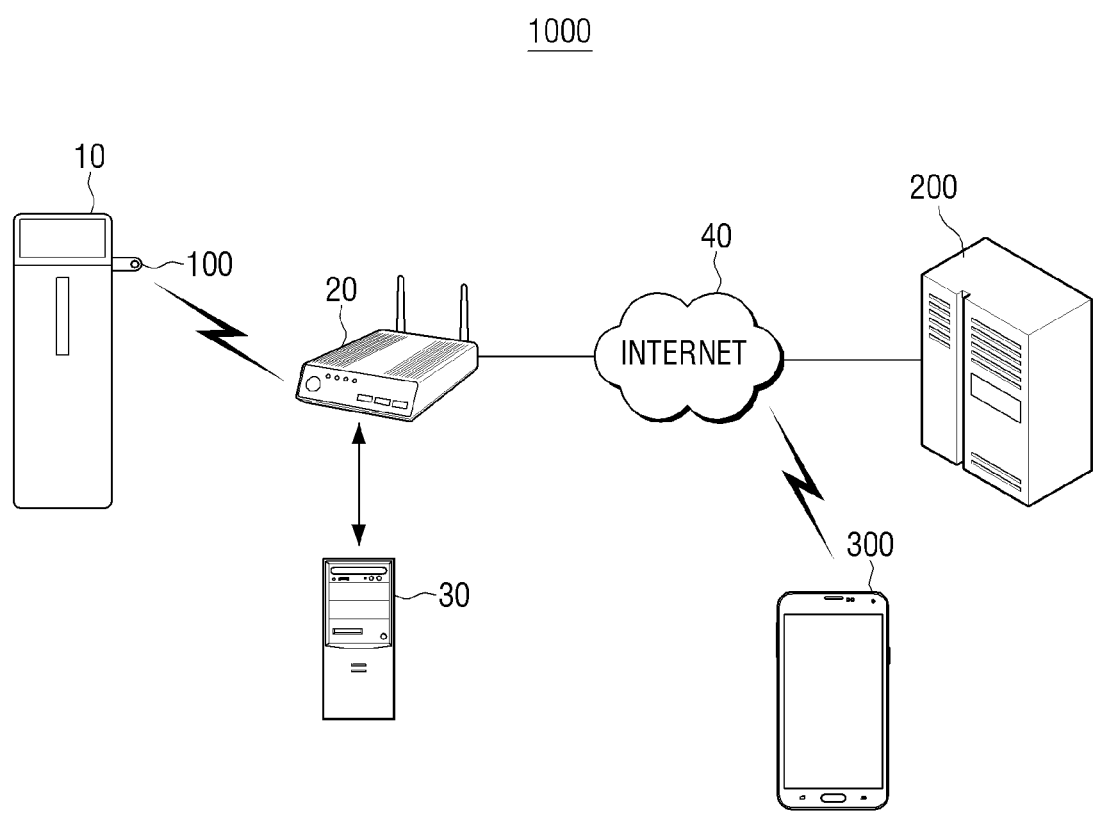
FIGS. 1A and 1B are diagrams illustrating two types of system, according to an example embodiment.
Figure 1B:
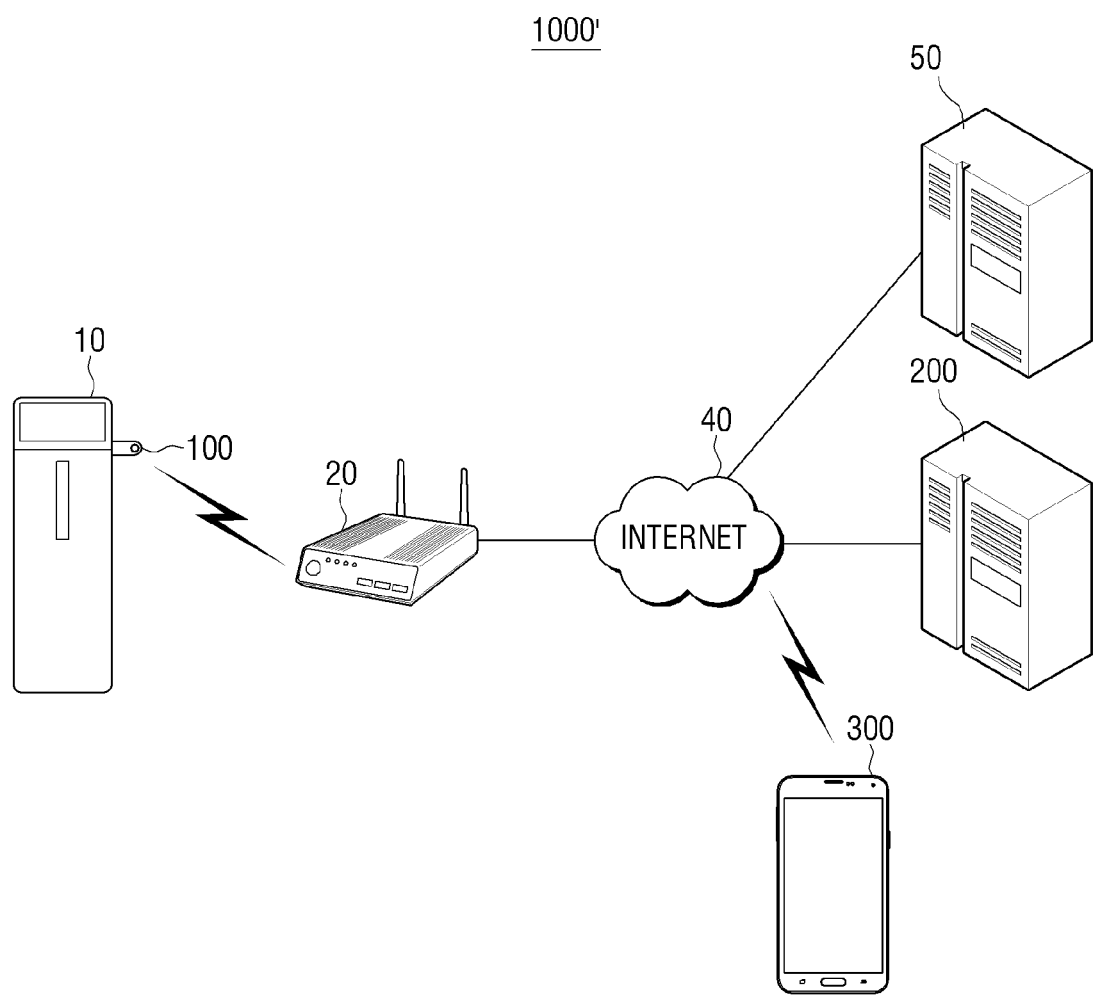

FIGS. 1A and 1B are diagrams illustrating two types of system, according to an example embodiment.

Referring to FIG. 1A, a system according to an example embodiment includes an air conditioner 10, a dongle bonded to the air conditioner 10, an AP 20, a home server 30, a server 200, and a mobile phone 300.

The air conditioner 10 does not support a wireless communication function. However, the air conditioner 10 may receive input of a control signal received from an external source via a dongle 100 connected to a communication port.

The dongle 100 provides a wireless communication function to the air conditioner 10. In detail, the dongle 100 may transmit and receive a radio frequency signal according to a particular communication method. In addition, the dongle 100 may convert the received radio frequency signal into an electrical signal and output the converted electrical signal to the air conditioner 10, or may convert an electrical signal received from the air conditioner 10 into a radio frequency signal and output the radio frequency signal.

An access point (AP) may connect one or a number of devices to be able to perform communication. In the example of FIG. 1A, the AP 20 is wirelessly connected to the dongle 100, and connected to the home server 300 via a cable. In addition, the AP 20 is connected to the Internet network 40.

The home server 30 controls and manages devices on a local network which are connected via the AP 20. The home server 30 may collect and store data. The home server 30 may carry out registration and authentication of a user accessing a home network.

The server 200 is managed and operated by the manufacturer. The server 200 transmits an appropriate program to the dongle 100 purchased by the user via the Internet. The server 200 may search for a suitable program for the air conditioner 100 and transmit the found program to the dongle 100. In addition, the server 200 may, as an after service for customers, store an up-to-date version of program for which a program stored in the dongle 100 has been modified and supplemented, and transmit the stored program to the dongle 100 for update.

The mobile phone 300 may be connected to the Internet either directly or via a mobile communication network, such as 3G, LTE network, and the like. In addition, the user of the mobile phone 300 may access the home server 30 and discovers the air conditioner 10 connected to the home network, and input a command for controlling the air conditioner 10. The mobile phone 300 may transmit a signal according to the input user command to the home server 30.

The home server 30 may transmit a command signal for controlling one or a number of devices via the AP 20 according to the received user command. If the home server 30 receives an air conditioning initiation command from the mobile phone 300, the home server 300 may transmit an operate command signal according to a predetermined protocol to the air conditioner 10, air purifier (not illustrated) and dehumidifier (not illustrated) connected to the home network.

The dongle 100 receives an operate initiation command from the home server 30. In addition, the dongle 100 converts the received operate initiation command to a control signal interpretable by the air conditioner 10 according to a program downloaded from the server 200 and output the control signal.

Referring to FIG. 1B, a system 1000' according to another example embodiment that the home server 300 is excluded from the elements of the system 1000 illustrated in FIG. 1A. In addition, the system 1000' includes an air conditioner 10, a dongle 100 bonded to the air conditioner 10, an AP 20, a server 200 and further, a management server 50. The description of the same operation of each element will be omitted.

The management server 50 provides a service capable of constructing a home network of household devices of the user. In detail, the management server 50 is an online service, and may register devices connected to network in a user's account, and monitor and control IoT devices automatically registered manually or according to a predetermined task according to a user's command.

The user accesses the management server 50 by using the mobile phone 300. After the procedure of authentication, the user may identify an air conditioner 10 in an online state registered in the account and input an operation for controlling the air conditioner 10.

The mobile phone 300 transmits a command signal according to the input operation to the dongle 100. In detail, the mobile phone 300 may be, after the authentication procedure, granted an access authority from the management server 500 and transmit a command signal for controlling the air conditioner 10 to the dongle 100.

The dongle 100 may convert a command signal received from the mobile phone 300 into a control signal in the form interpretable by the air conditioner 10 by using a program downloaded from the server 200 and output the converted control signal.

The systems 1000 and 1000' according to an example embodiment allow even an old type air conditioner not supporting a wireless communication to construct and integrally control a home network via the dongle 100.

Figure 2:
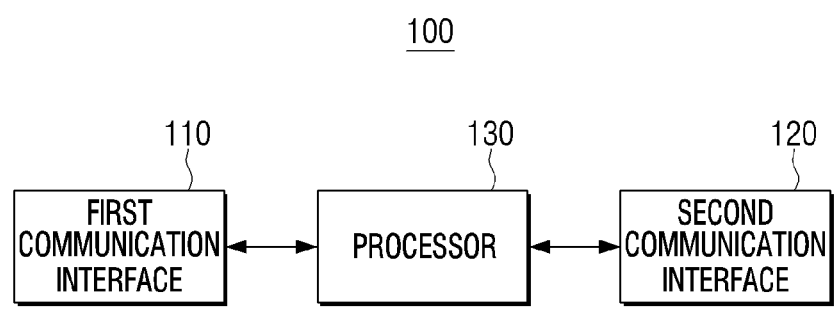
FIG. 2 is a block diagram of a configuration of a dongle, according to an example embodiment.

FIG. 2 is a block diagram of a configuration of a dongle, according to an example Referring to FIG. 2, the dongle 100 includes a first communication interface 110, a second communication interface 120, and a processor 130.

The first communication interface 110 carries out wireless communication. In detail, the first communication interface 110 may carry out wireless communication according to a particular communication method with an external device.

The first communication interface 110 may support a wireless communication method using a radio frequency, such as Wi-Fi, Bluetooth, WiBro and Zigbee, or a light such as an infrared ray. In addition, various other forms of wireless communication method, such as an acoustic communication using an acoustic wave, for example, an ultrasonic wave of inaudible area, may be applied to the first communication interface 110. The first communication interface 110 enables the dongle 100 to carry out communication via a home network or an Internet network.

The second communication interface 120 carries out communication with a device. In an example embodiment, the second communication interface 120 may be physically connected to a particular device and carry out wired communication. The second communication interface 120 may configure a connector to be coupled with a port provided in the device so that the dongle 100 may be attached to or detached from the device. The second communication interface 120 may support a variety of wired communication methods, such as universal serial bus (USB), serial peripheral interface (SPI), peripheral component interconnect (PCI), and RS-based methods RS-232, RS-422, and RS-485.

In another example embodiment, the second communication interface 120 may carry out wireless communication with a device. In this regard, the second communication interface 120 may communicate with a device by using the same or different communication method as the first communication interface 110. If the same communication method is used, the second communication interface 120 may communicate with a device at a different time or frequency band from the first communication interface 110 so that no interference occurs. For example, the second communication interface 120 may carry out communication with the device by using an infrared ray. In this regard, the device may include an infrared ray receiver for infrared ray communication or may be connected to an additional infrared ray receiver. The communication method using the infrared ray described above may use a simple form of light emission pattern, such as a remote controller, or may comply with an infrared data association (IrDA) standard. The second communication interface 120 may control information received via the dongle 100 to be transferred to the device.

The processor 130 controls the respective components of the dongle 100. In detail, the processor 130 may control the respective components for wireless communication of the dongle 100 and a control function of the device.

The processor 130 receives identification information of the device from a device connected via the second communication interface 120. In detail, the processor 130 may request identification information to the device connected to the second communication interface 120 and receive identification information from the device. Alternatively, the processor 130 may read, from the connected device, identification information recorded on a memory accessible via the second communication interface 120.

The processor 130 controls the first communication interface 110 to download a control program for controlling the connected device from the server based on the identification information of the device. In detail, the processor 130 may control the first communication interface 110 to transmit a signal requesting a program corresponding identification to a server present in a predetermined address on a network based on the received identification information. In addition, the processor 130 may receive a program received from the server.

The processor 130 may identify a type of connected device based on identification information of the device. In detail, the processor 130 may identify a type of device connected to the second communication interface 120 from the identification information of the device. For example, the identification information may be a model name or serial number of the device. In addition, the processor 130 may search for a model type corresponding to the received model name or the received serial number in a storage (not illustrated), and identify that the second communication interface 120 is connected to the model type (e.g., air conditioner, washing machine, TV, oven and refrigerator).

In this regard, the identification information may be described in various forms. For example, the identification information may be described as a standard American Standard Code for Information Interchange (ASCII) code, a unicode, and a code for which a character or a number undergoes binary conversion or hexadecimal conversion (e.g., EBCDIC).

In addition, when a type of connected device is identified through the second communication interface 120, the processor 130 may control the first communication interface 110 to request a program corresponding to the identified type to a server and download the program.

If the connected device is a new product of a new lineup not present at the time of manufacturing and thus, a type of device is not identified based on the received identification information, the processor 130 controls the first communication interface 110 to transmit the identification information to the server. In detail, in a case in which a model type corresponding to a model name or serial number received from the classification information stored in the storage (not illustrated) is not found and cannot be identified, the processor 130 may transmit the received model name or the received serial number itself to a server and control to search for a control program corresponding to the model name or serial number received from a server having the most recent information.

In addition, the processor 130 may control the first communication interface 110 to download the found control program from the server.

The processor 130 may control the second communication interface 120 to output a control signal for controlling a connected device by using the downloaded control program. In detail, when the downloaded control program is stored in a storage (not illustrated), thereafter, the processor 130 generates a control signal capable of controlling a connected device as corresponding to a command received via the first communication interface 110 by using a control program, and output the generated control signal via the second communication interface 120.

In this regard, the control command includes all forms of software which are programmed to control the connected device. For example, the control program may convert a "go" message input through wireless communication to a "run" message in the form recognizable by a controller in the device. In addition, the control program may include a protocol which is capable of interpreting the received command. For example, the protocol may be a Smart Home Protocol (SHP) which is developed for Samsung Electronics (®) to interlock household devices. By complying one protocol which is standardized for home network communications, designers can easily manufacture devices to support an IoT function and facilitate design of interoperation between devices.

As another example, a control program may simply be software which is programmed to acquire only a part that contains details to control a device from a command signal prepared according to a protocol. A control message included in a control signal may be immediately transmitted to a device.

The dongle 100 as described above may provide a function capable of adaptively downloading a program from a server according to the bonded device and controlling the device via a network.

Figure 3:
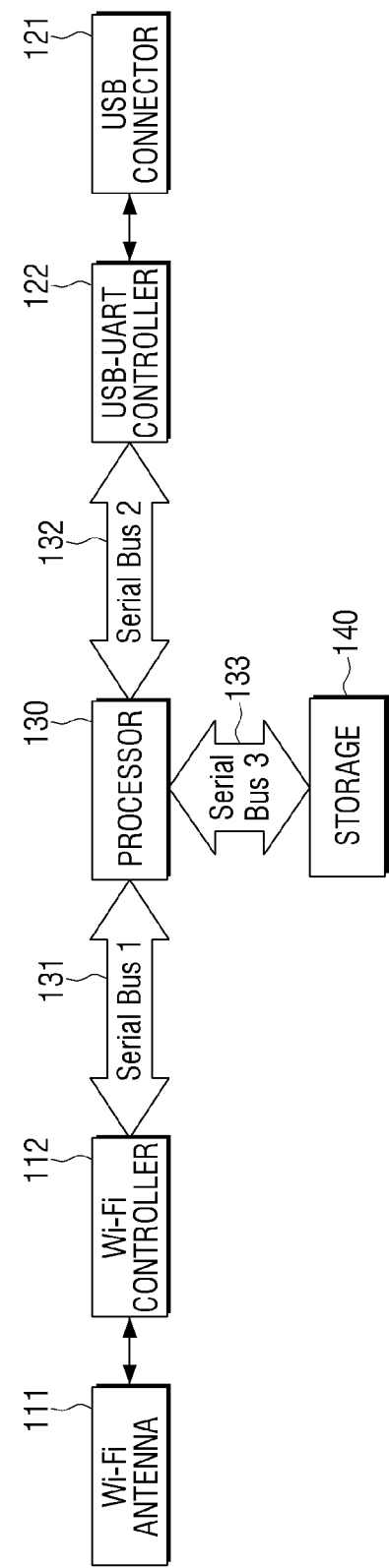
FIG. 3 is a block diagram illustrating a more detailed configuration of a dongle, according to an example embodiment.

FIG. 3 is a block diagram illustrating a more detailed configuration of a dongle, according to an example embodiment.

Referring to FIG. 3, a dongle 100 is connected to a device via a USB connector and connected to a network via Wi-Fi. In detail, in the example of FIG. 3, the first communication interface 110 of FIG. 2 includes a Wi-Fi antenna 111 for wireless communication with network and a Wi-Fi controller 112. The second communication interface 120 includes a USB connector 121 for wired communication with a device and a USB-UART controller 122.

The Wi-Fi antenna 111 includes one or more antennas for transmission and reception of a Wi-Fi wireless signal. The Wi-Fi controller 112 may comply with a communication standard 802.11 b/g/n, and may carry out an additional function, such as conversion between a soft AP mode and a station mode, a TCP/IP protocol communication, a diversity control of a Wi-Fi-antenna 111, and the like.

The USB connector 121 is a connector which is capable of being connected to a standardized USB port. In addition, the USB-UART controller 122 relays communication between a serial bus 132 within the dongle 100 and a different passage of the USB connector 121.

The processor 130 may be implemented as at least one of an application specific integrated circuit (ASIC), an embedded processor, a microprocessor, a hardware control logic, a finite state machine (FSM), and a digital signal processor (DSP).

In addition, the processor 130 is connected to the respective components via serial buses 131, 132 and 133 for communication. The storage 140 stores a control program for driving the dongle 100 and controlling the components, and records an external input signal or data or provides an area for the processor 130 to carry out an operation. The storage 140 may include at least one of ROM, RAM, a flash memory, a hard disk drive, and a solid state drive.

Hereinabove, a configuration of the dongle 100 according to an example embodiment is described. A procedure of how a device is connected to a network via a dongle will be described below.

Figure 4:
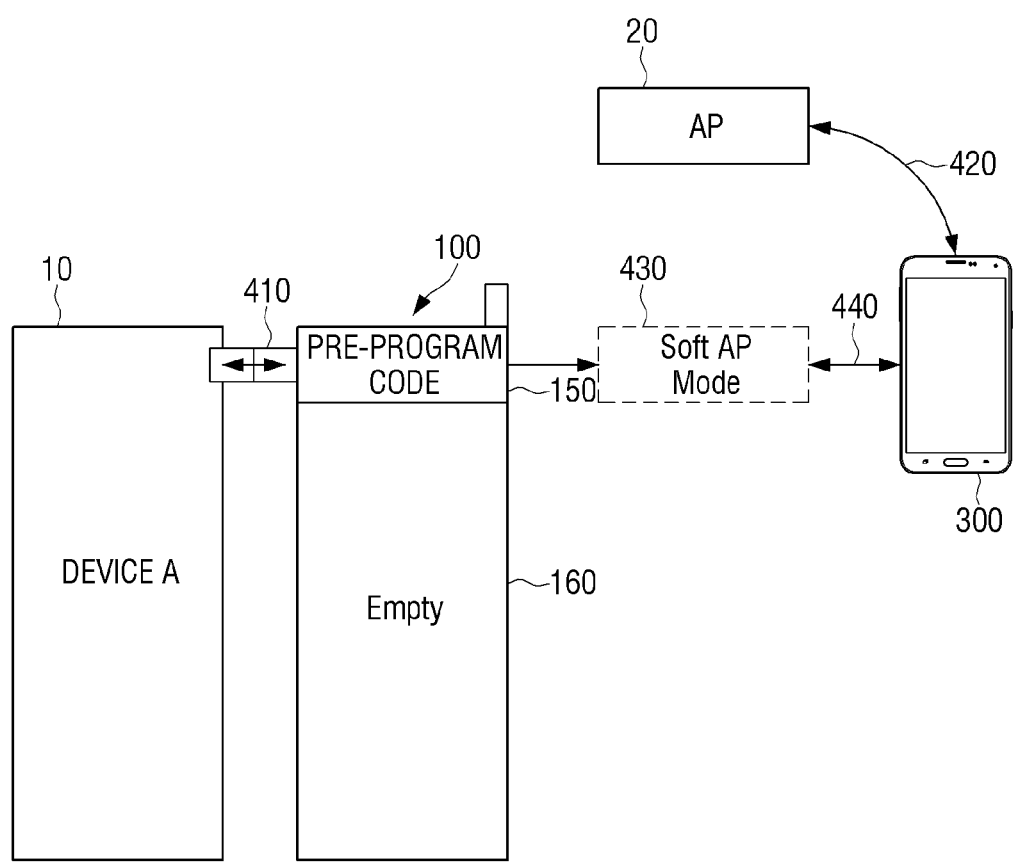
FIGS. 4 and 5 are diagrams illustrating an AP connection method of a dongle, according to a first example embodiment.
Figure 5:
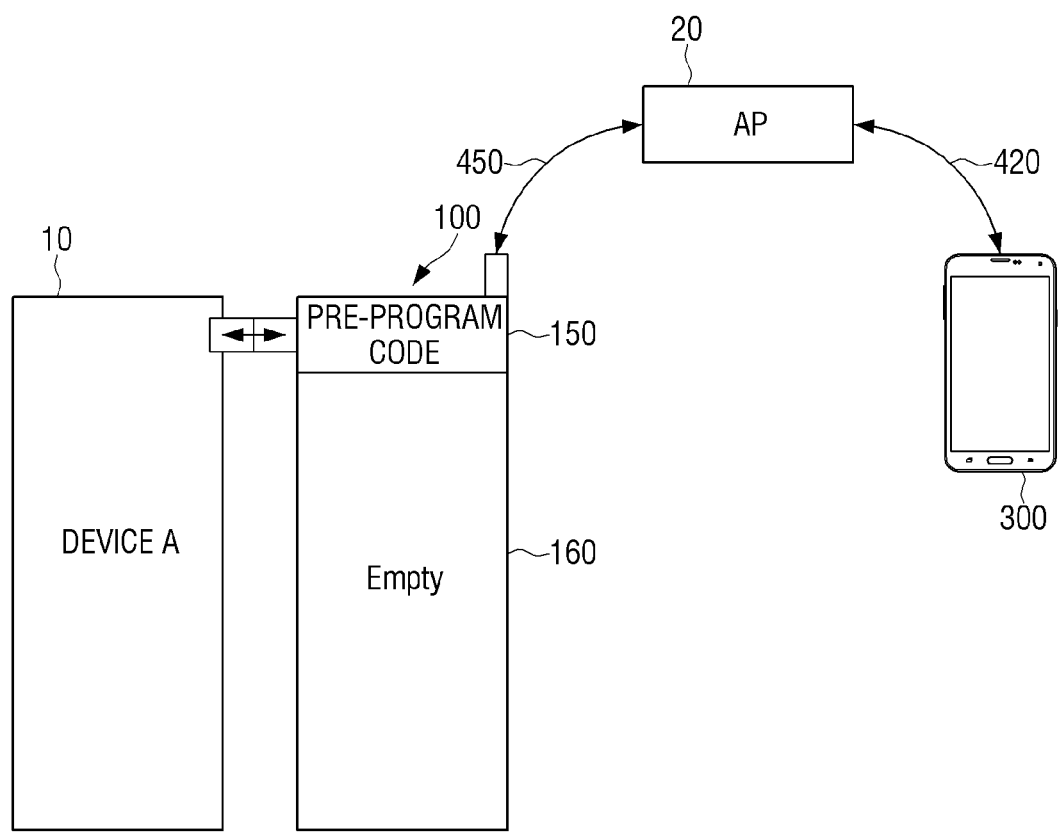

FIGS. 4 and 5 are diagrams illustrating an AP connection method of a dongle, according to a first example embodiment.

Referring to FIG. 4, a dongle 100 is bonded to a device A 10 which does not support an IoT. An initial dongle 100 merely stores only a pre-program code 150, and has a spare empty storage space 160.

First, the dongle 100 requests identification information to the device A 10 bonded according to the pre-program code 150, and acquires identification information of the device A, at operation 410. The acquired identification information is a model ID indicating the device A. In addition, the model name transmitted by the device A is written in an ASCII code.

The dongle 100 converts the mode to a soft AP mode, at operation 430. In the soft AP mode, the dongle 100 plays a role of a common AP. In detail, the dongle 100 controls itself to inform itself as an accessible AP to other peripheral devices. The mobile phone 300 scanning a peripheral signal discovers the dongle 100 in the soft AP mode and is communicatively connected with the dongle 100. It can be said that the dongle 100 and the mobile phone 300 correspond to a client of a group owner (GO) playing a role of an AP of a P2P group in the Wi-Fi-direct technology.

The dongle 100 broadcasts an advertisement signal including identification information of the device A 10. In detail, when the dongle 100 gives information about itself in the soft AP mode, the dongle 100 may output an advertisement signal indicating that the advertisement signal is a signal broadcasted from the device A 10. Accordingly, the user of the mobile phone 300 may identify that a signal related to the device A 10 is caught in a user interface of the mobile phone 300.

In this regard, the dongle 100 may include identification information of the device A 10 which is written in ASCII code in a service set identifier (SSID) field of a message of the advertisement signal. The SSID field is an optional space provided in which information for identifying an AP in the Wi-Fi communication standard may be written from among the message.

The mobile phone 300 includes a display for displaying a user interface. In addition, the mobile phone 300 is connected to an AP 20 connected to a network according to a user input via the user interface.

The mobile phone 300, when connected to the dongle 100, transmits, to the dongle 100, information required for connecting the AP 20, at operation 440. For example, the mobile phone 300 may transmit, to the dongle 100, authentication information, such as an ID of the connected AP 20 and a password input by the user.

Next, referring to FIG. 5, the dongle 100 converts the mode from the soft AP mode to the station mode. In addition, the dongle 100 may, after scanning a peripheral signal, set up connection with the AP 20 by using the AP information received from the mobile phone 300.

Using the method described above, the dongle 100 in which a user interface is not present may access the AP 20 to enable network communication.

Figure 6:
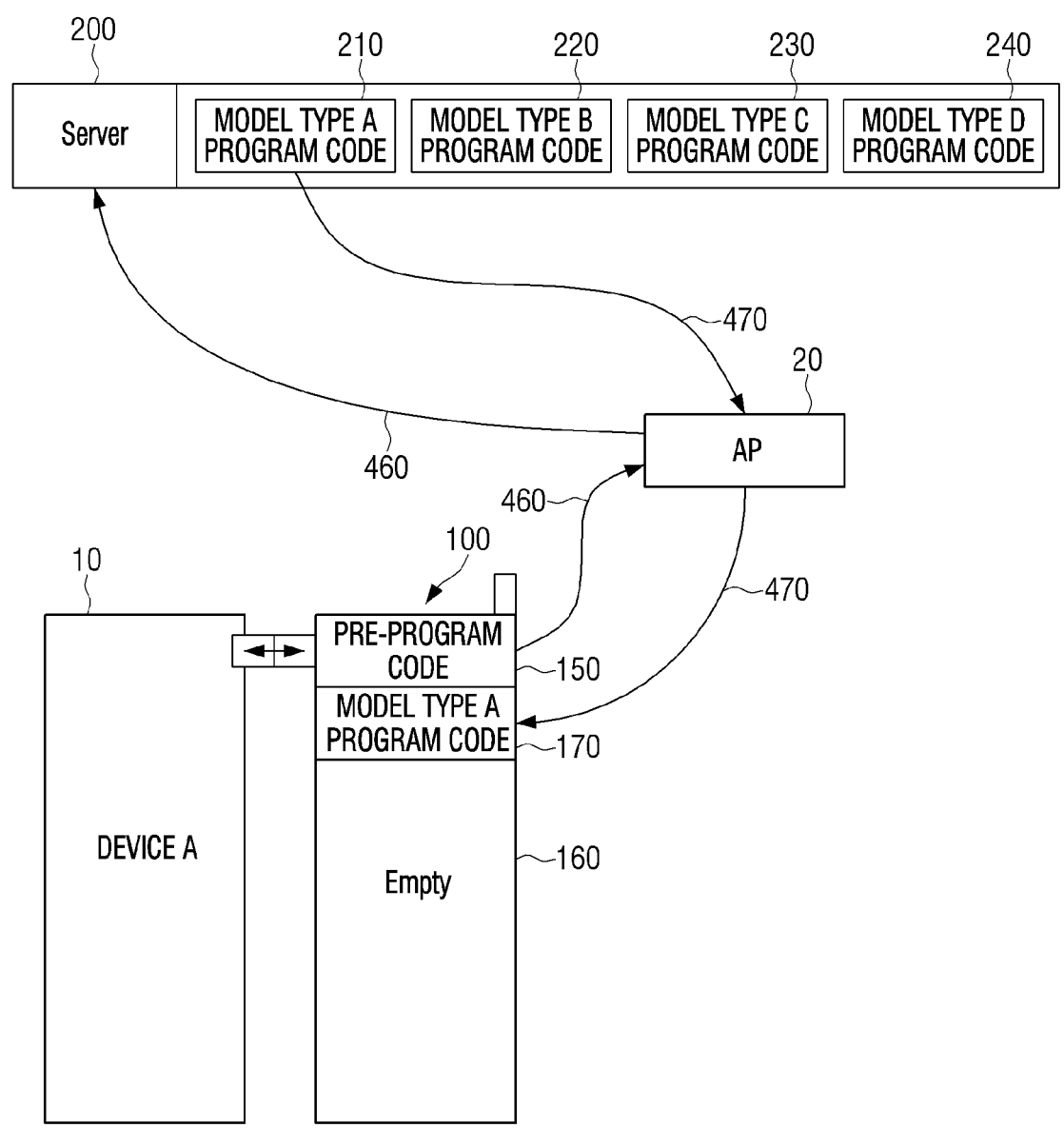
FIGS. 6 and 7 are diagrams illustrating a program downloading method and device control method of a dongle, according to the first example embodiment.
Figure 7:
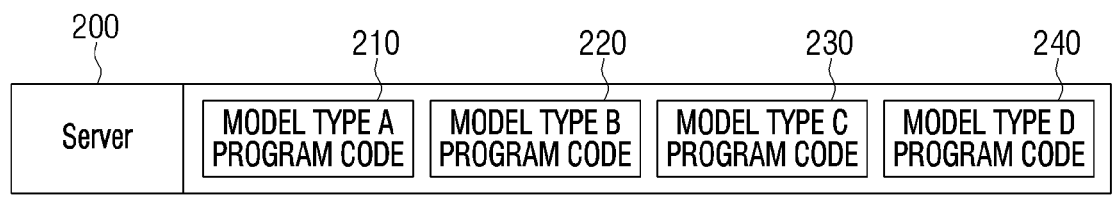
Figure 7:
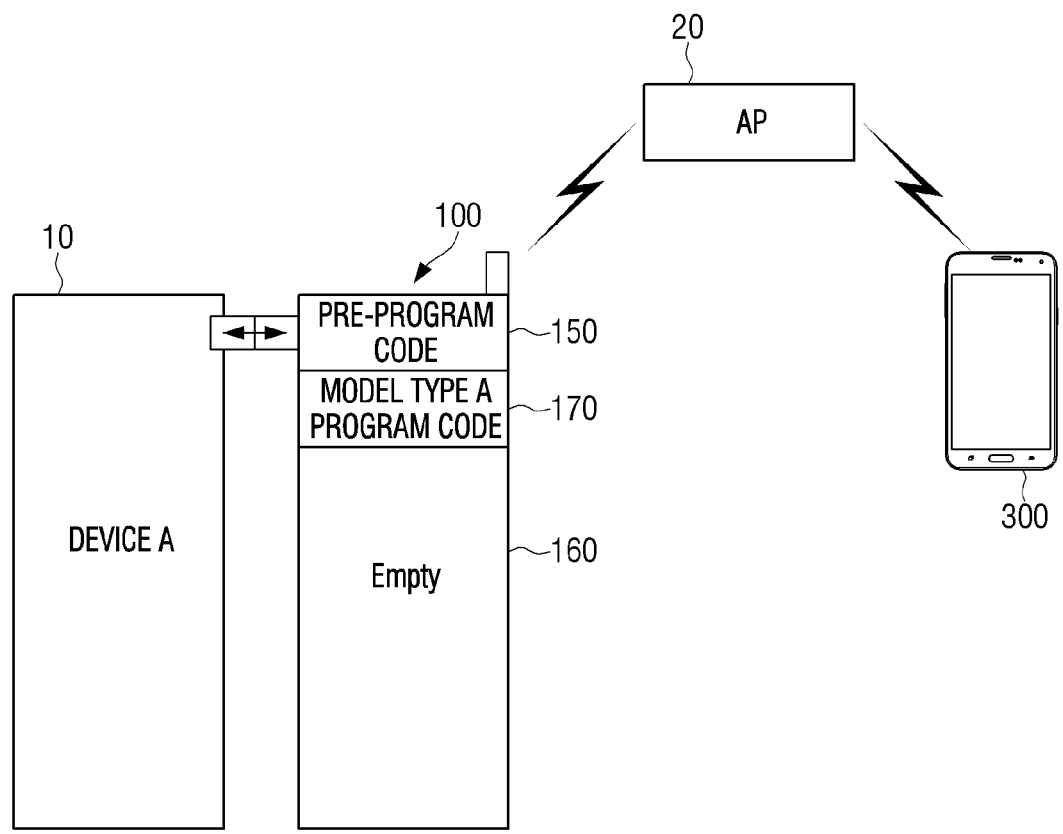

FIGS. 6 and 7 are diagrams illustrating a program downloading method and device control method of a dongle, according to the first example embodiment.

Referring to FIG. 6, the dongle 100 may, according to a pre-program code 150, d identify a model type of the device A 10 based on the identification information of the device A 10, and request a program corresponding to the identified model type of the device A to the server 200, at operation 460.

When the request is received, the server 200 searches for a program corresponding to the requested model type A from among a number of stored control programs 210, 220, 230 and 240. In addition, the server 200 transmits a program code 210 of the found model type A to the dongle 100, at operation 470.

The dongle 100 downloads a control program code 210 capable of controlling a model type corresponding to the device A from the server 200. The downloaded program code 170 is stored in an empty memory space 160 of the dongle 100.

Next, referring to FIG. 7, the dongle 100 receives a command signal from a mobile phone 300 on the network and the like, via the AP 20. When the command signal is received, the dongle 100 generates a control signal capable of controlling the device A 10 by using the downloaded control program 170, and outputs the generated control signal to the device A 10.

A control signal for controlling the device A 10 may be sent from another device on the home network configured by the AP 20. Alternatively, the control signal may be sent from an external device on the Internet connected to the AP 20 or from an external device on a mobile communication network.

If the dongle 100 is removed from the device 10 and bonded to a device of a different model type, the dongle 100 may download a new control program corresponding to a model type of the bonded device from the server 200.

By the method described above, the dongle 100 does not store all types of program which may be required and downloads only a program corresponding to the bonded device and thus, versatility and extendibility of flexible functions may be obtained. In addition, as described above, even if a model type of a new product to which the dongle 100 is bonded cannot be known, as long as a control program corresponding to the new product is provided in the server 200, the dongle 100 may download the control program and use it.

Figure 8:
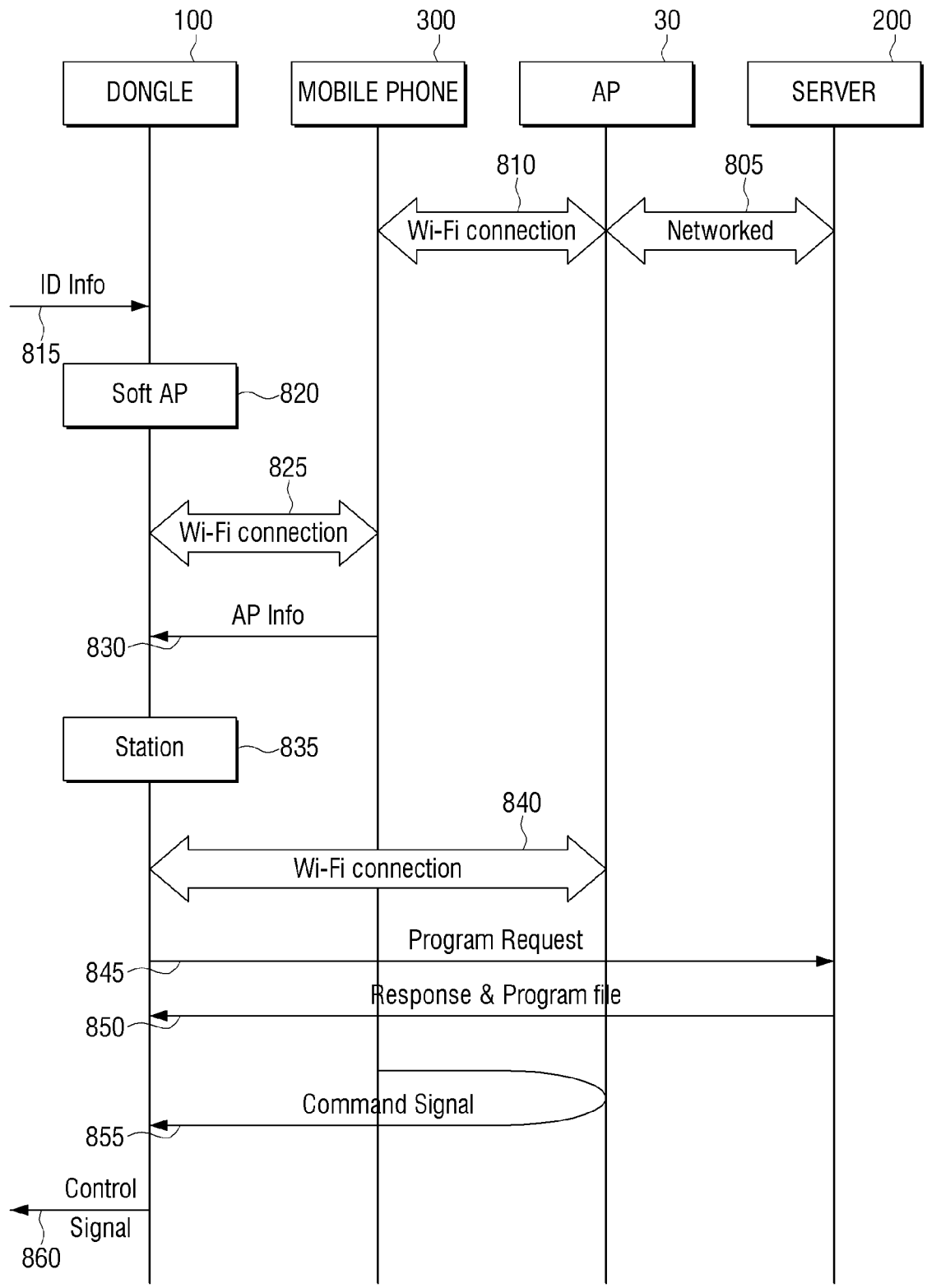
FIG. 8 is a sequential diagram illustrating a communication method of a system, according to the first example embodiment of FIGS. 4-7.

FIG. 8 is a sequential diagram illustrating a communication method of a system, according to the first example embodiment of FIGS. 4-7.

Referring to FIG. 8, the AP 30 and the server 200 are connected to each other on a network, at operation 805. In addition, the mobile phone 300 sets up communication using Wi-Fi, at operation 810.

The dongle 100 is bonded to a device. In addition, the dongle 100 receives identification information from the device, at operation 815. The dongle 100 which has received the identification information converts the mode to a soft AP mode, at operation 820. The dongle 100 broadcasts an advertisement signal including the received identification information.

The mobile phone 300 sensing the advertisement signal of the dongle 100 sets up communication with the dongle 100 by using Wi-Fi, at operation 825. In addition, the mobile phone 300 transmits, to the dongle 100, AP information which is used for connection 810 with the AP 30, at operation 830.

The dongle 100 converts the mode to a station mode, at operation 835. The dongle 100 in the station mode sets up communication with the AP 30 by using Wi-Fi based on the received AP information, at operation 840.

The dongle 100 having been able to access the network by being connected to the AP 30 requests a control program corresponding to the device to a server 200 of a predetermined address based on the identification information, at operation 845. As a response to the request, the server 200 transmits a control program corresponding to a model type of the device to the dongle 100, at operation 850.

Thereafter, the mobile phone 300 approaches to the dongle 100 accessed to the AP 30 via a network, and transmits a command signal for controlling a device to which the dongle 100 is bonded, at operation 855. The dongle 100 having received the command signal outputs a control signal corresponding to the received control signal by using the downloaded control program, at operation 860.

Figure 9:
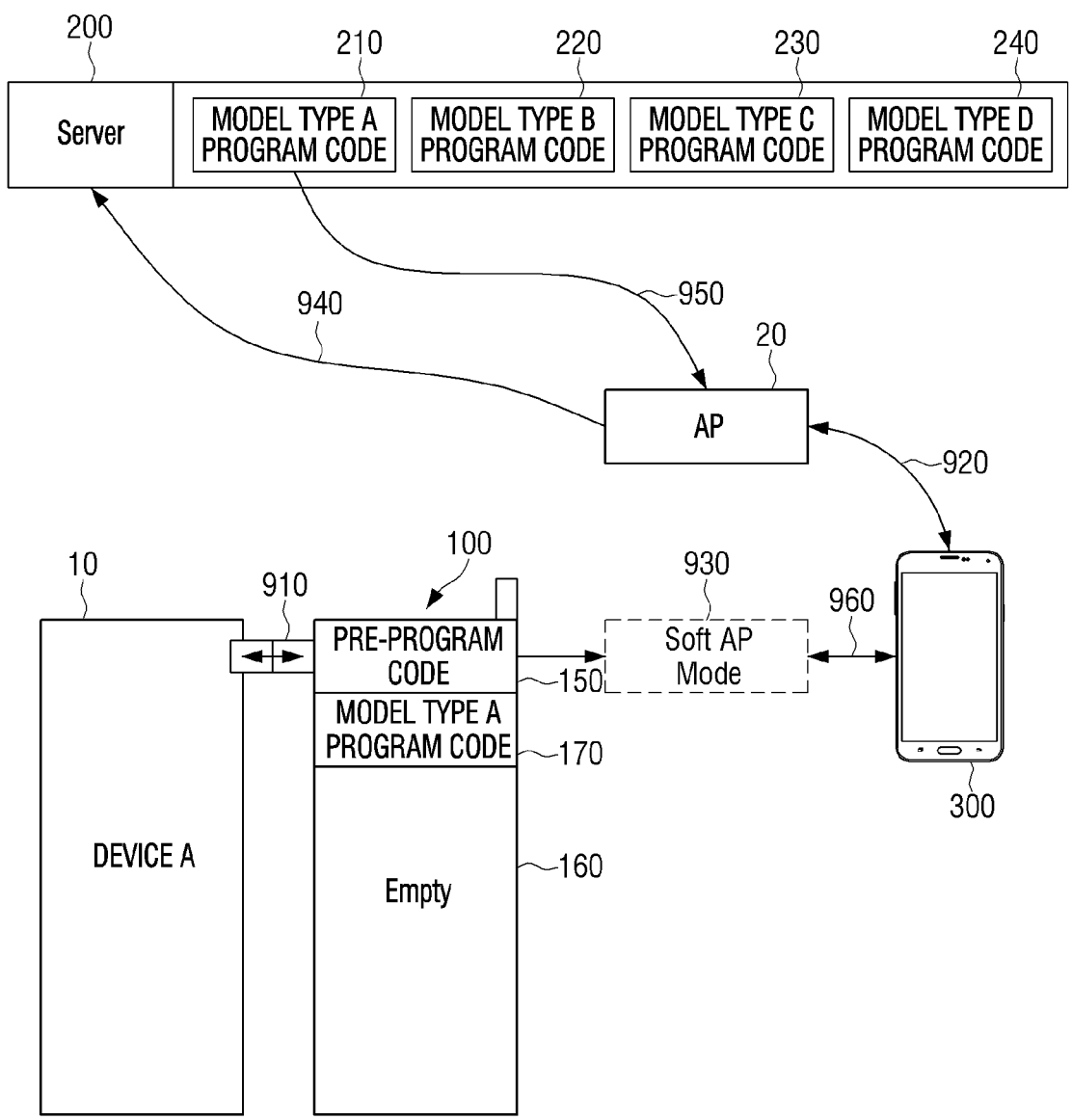
FIG. 9 is a diagram illustrating an AP connection method and program download method of a dongle, according to a second example embodiment.

FIG. 9 is a diagram illustrating an AP connection method and program download method of a dongle, according to a second example embodiment.

The example embodiment of FIG. 9 is the same as the example embodiment of FIGS. 4 and 5. However, in this example embodiment, the dongle 100 does not directly downloads a control program from the server 200 but the mobile phone 300 downloads the control program.

Referring to FIG. 9, the dongle 100 is bonded to the device A 10. In addition, the dongle 100 receives identification information of the device A from the device A 10, at operation 910.

The dongle 100 converts the mode to a soft AP mode in which an advertisement signal including the identification information is broadcasted, at operation 930.

Meanwhile, the mobile phone 300 is connected to the AP 20, at operation 920. In addition, the mobile phone 300 senses an advertisement signal of the dongle 100. The mobile phone 300 may identify that a new AP which has not been previously found is present and that an identifier recorded in an SSID is information relating to a particular device.

The mobile phone 300 identifies, from the sensed advertisement signal, that a new device A 10 is in a state to access a network via the dongle 100. In addition, the mobile phone 300 requests a control program corresponding to the device A 10 to the server 200 by using identification information included in the sensed advertisement signal, at operation 940. The mobile phone 300 may identify a type of the device A 10 by using the identification information, and request a control program corresponding to the identified model type to the server 200. Alternatively, the mobile phone 300 may transmit a signal requesting a control program along with identification information to the server 200 without identifying a model type.

In response to the received request, the server 200 searches for a control program corresponding to a model type of the device A 10, and transmits a control program code 210 of the found model type A to the mobile phone 300, at operation 950.

The mobile phone 300, when downloading of the program code 210 of the device A from the server 200 is completed, connects to the dongle 100 in the soft AP mode, at operation 960. In addition, the mobile phone 300 transmits the downloaded control program to the dongle 100 along with the AP information required for accessing the AP 20.

The dongle 100 receives a control program 170 from the mobile phone 300 and stores it in an empty space 160 of the memory. In addition, the dongle 100 connects to the AP 20 by using the received AP information.

Thereafter, the dongle 100 may switch to the station mode and carry out the operation as in FIG. 7.

Figure 10:
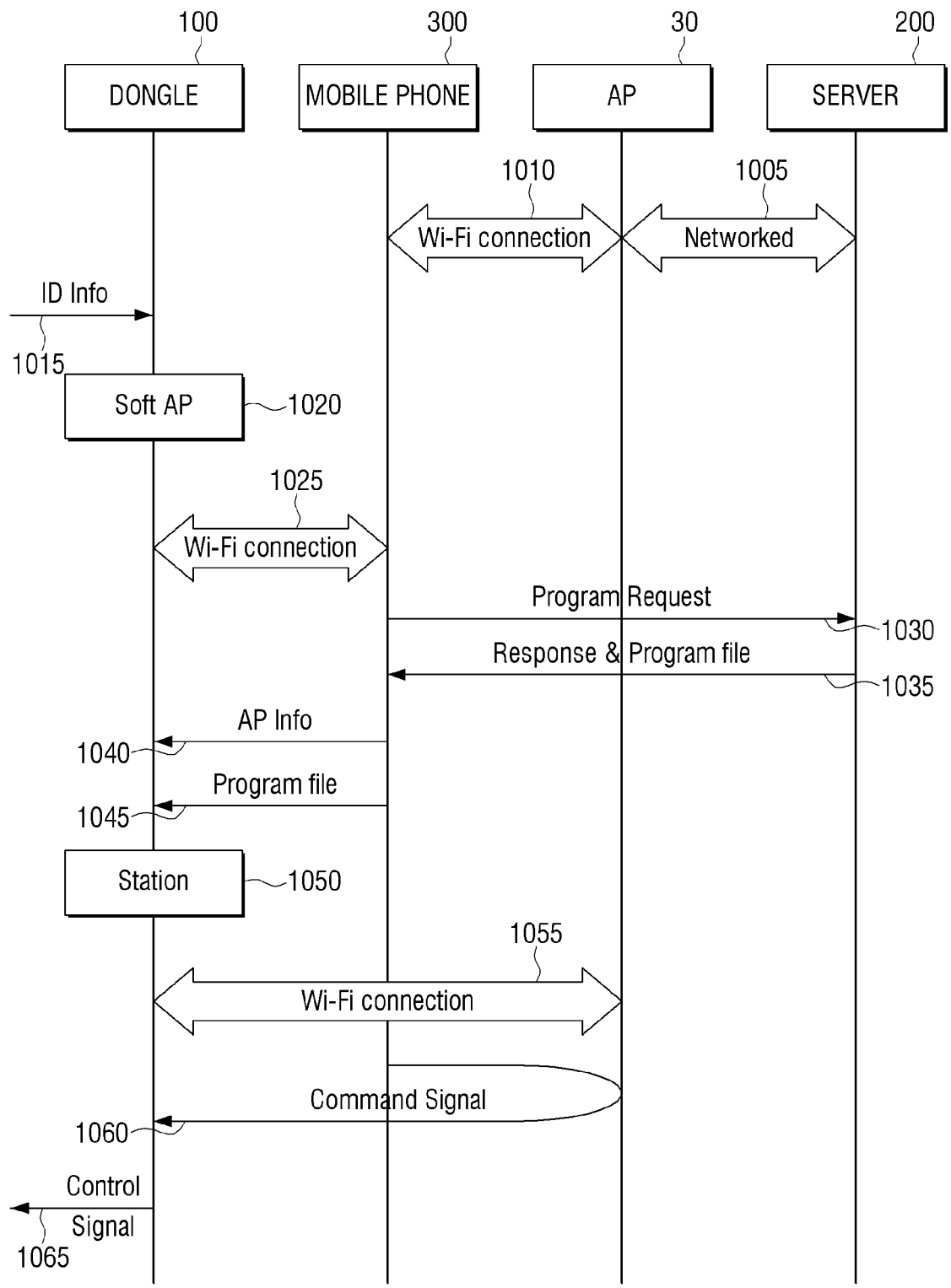
FIG. 10 is a sequential diagram illustrating a communication method of a system, according to the second example embodiment of FIG. 9.

FIG. 10 is a sequential diagram illustrating a communication method of a system, according to the second example embodiment of FIG. 9.

Most of the operations of FIG. 10 are identical to the procedures of FIG. 8. Referring to FIG. 10, the AP 30 is connected with the server 200 via a network. In addition, the mobile phone 300 is connected to the AP 30 using Wi-Fi, at operation 1010.

The dongle 100 receives identification information from the bonded device, at operation 1015. In addition, the dongle 100 converts the mode to a soft AP mode, at operation 1020.

The mobile phone 300 requests a program to the server based on identification information included in an advertisement signal broadcasted from the dongle 100, at operation 1030. In addition, from the server 200, the mobile phone 300 downloads a control program capable of controlling the bonded device along with a response to the request.

The mobile phone 300 is connected to the dongle 100 in the soft AP mode by using Wi-Fi, at operation 1025. In addition, the mobile phone 300 transmits AP information required for accessing the AP 30 to the dongle 100, at operation 1040, and transmits a downloaded control program to the dongle 100, at operation 1045.

The dongle 100 converts the mode to the station mode when all AP information and control programs are received. The dongle 100 in the station mode accesses the AP 30 by using the received AP information.

Thereafter, the dongle 100 receives a command signal via the AP 30 from a device on the same network as the mobile phone 300, at operation 1060. The dongle outputs a control signal corresponding to the received control signal to the device by using a control program, at operation 1065.

Figure 11:
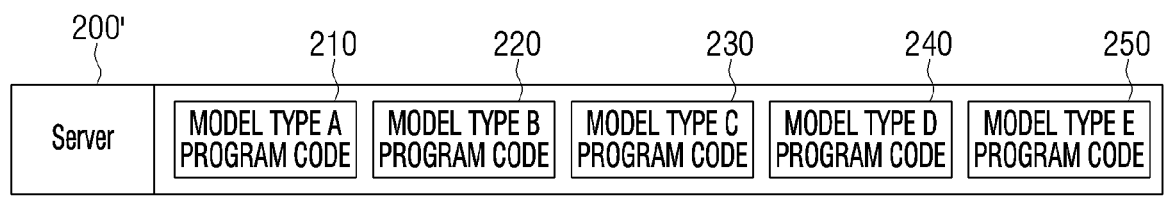
FIGS. 11-13 are diagrams illustrating another example of implementation using a communication method of a system, according to the first and second example embodiments.
Figure 11:
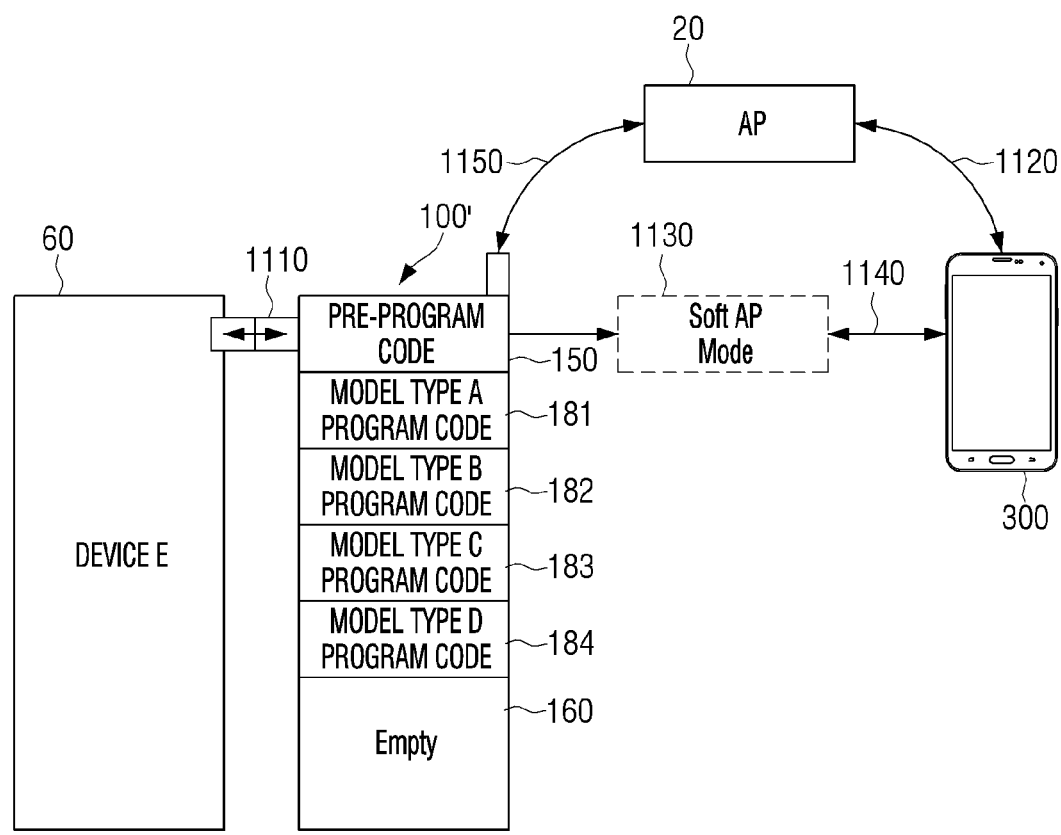
Figure 12:
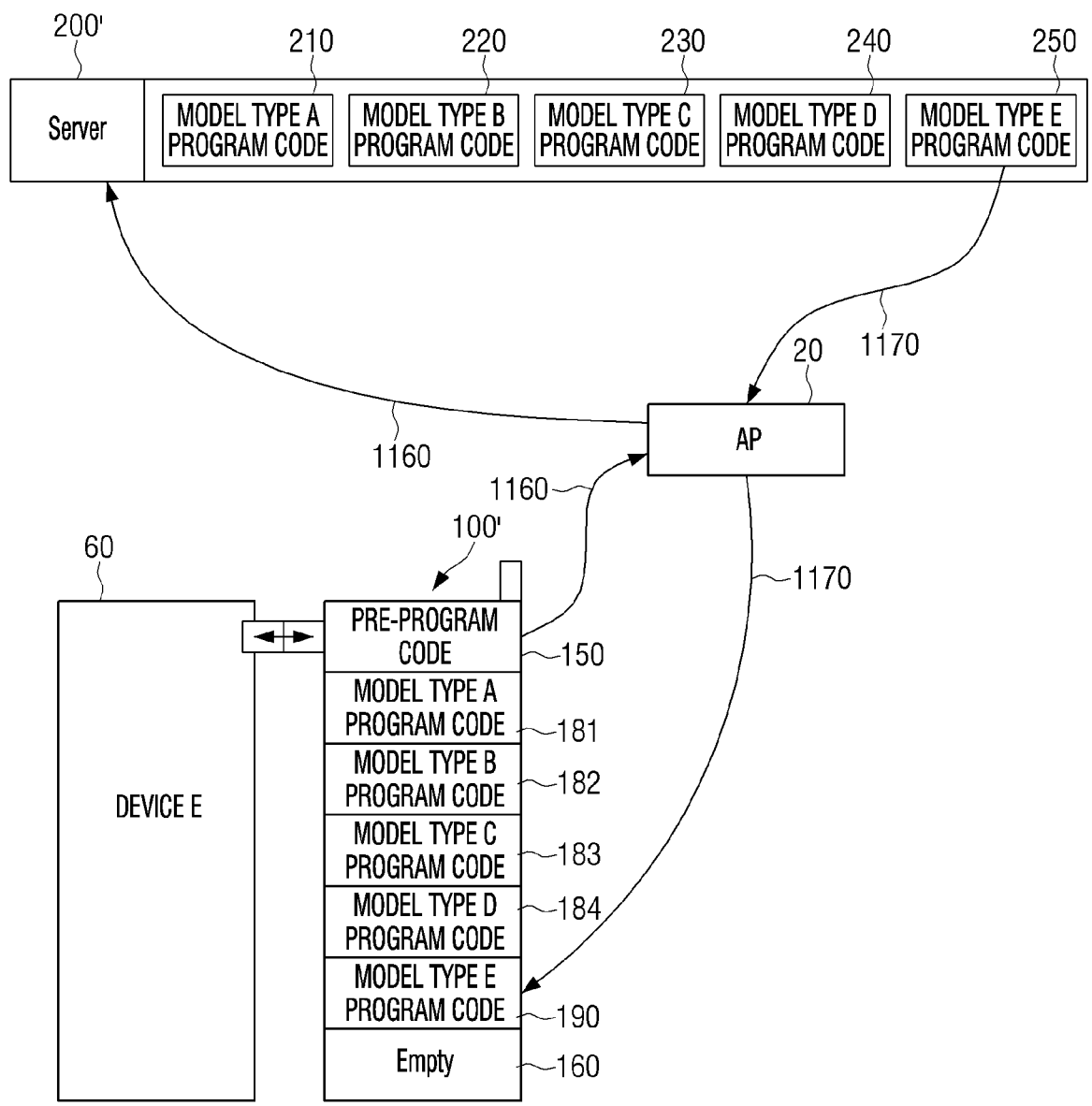
Figure 13:
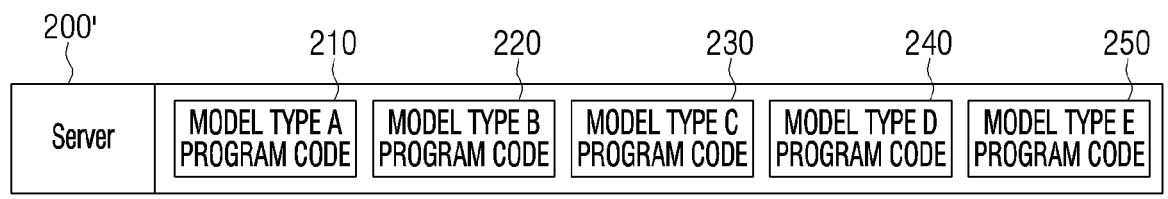
Figure 13:
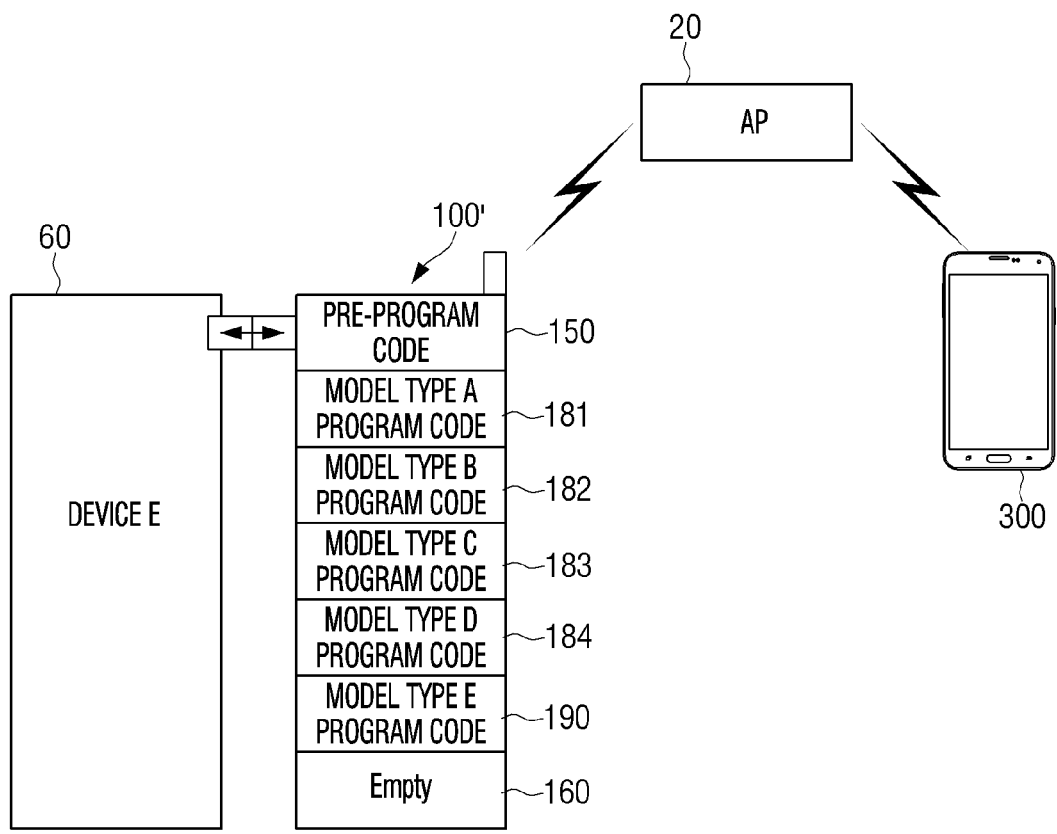

FIGS. 11-13 are diagrams illustrating another example of implementation using a communication method of a system, according to the first and second example embodiments.

Referring to FIG. 11, most of the components of the example embodiment of FIG. 11 are identical in configuration to the components of the first example embodiment of FIGS. 4 and 5.

The dongle 100' stores a pre-program code 150 and program codes 181, 182, 183 and 184 supporting devices of a plurality of model types. That is, the dongle 100' may be sold to consumers in the manufacturing and production stages, with the control programs for several product groups or models already stored.

In other cases, the dongle 100' may have been previously connected to devices of a plurality of model types, and may cumulatively store a plurality of control programs downloaded from the server 200' when connected to each of the devices.

In this regard, the dongle 100' is bonded to the device E 60. The device E 60 may be a new product which was not present at the time of development and manufacturing. Alternatively, the device E 60 may be a device of a new type which was not used in the related art by the user.

The server 200' stores a plurality of control programs 210, 220, 230, 240 and 250. The server 200' stores a control program of an up-to-date version for controlling devices of various model types. For example, a control program code 210 for the model type A stored in the server 200' may be a program of an upper version which is improved than the control program code 181 for the previous model type A stored in the dongle 100. In this case, the dongle 100' may notify the server 200' of a version of a stored program code 210 according to a pre-program code 150. In addition, the server 200' may transmit a program code 210 of a higher version to the dongle 200 to update the program code 181 of the previous version stored in the dongle 100'.

In addition, the server 200' stores a new program code 250 for new products. That is, the manufacturer operatively managing the server 200' may store a program code 250 for controlling a device of a new model type in the server 200 so that a newly-developed device or another additional device is supported.

It is assumed that the dongle 100' is initially connected to the device E 60. In addition, it is assumed that the dongle 100' is initially connected to the AP 20. If the dongle 100' has been connected to the AP 20, the connection for recommunicating with the AP 20 may be set up using the stored connection information.

The dongle 100' identifies whether a control program corresponding tot eh device E 60 is present from among the stored control programs 181, 182, 183 and 184 based on the identification information received from the bonded device E 60.

In addition, the dongle 100' may, as described above, convert the mode to the soft AP mode in which the advertisement signal including the identification information is broadcasted, at operation 1130.

Meanwhile, the mobile phone 300 has set up connection for communication with the AP 20, at operation 1120. In addition, the mobile phone 300 sets up connection with the dongle 100' based on an advertisement signal broadcasted from the dongle 100' in the soft AP mode, at operation 1140.

The mobile phone 300 transmits connection information required to communicatively connect with the AP 20 to the dongle 100'.

Thereafter, the dongle 100' converts the mode to the station mode, and accesses the AP 20 based on connection information received from the mobile phone 300.

Next, referring to FIG. 12, the dongle 100', when it is determined that the dongle 100' does not have a control program code capable of controlling the device E 60, transmits a request including identification information of the device E 60 to the server 200' via the AP 20, at operation 1160, to download a control program.

The server 200' searches for a control program corresponding to the model type E of the device E 60 according to a request received from the dongle 100'. In addition, the server 200' transmits the found program code 250 of the model type E to the dongle 100', at operation 1170. In this procedure, the dongle 100' and the server 200' may further exchange information for determining whether an empty memory space 160 of the dongle 100' is sufficient to store the program code 250 of the model type E. If the empty memory space 160 is not sufficient, the dongle 100' may delete at least one of the stored program codes 181, 182, 183 and 184 according to a predetermined criterion, such as oldest or least recently used.

The dongle 100 downloads a control program code 250 capable of controlling a model type E corresponding to the device E 60. The downloaded program code 190 is stored in the empty memory space 160.

Next, referring to FIG. 13, as similar to FIG. 7, the dongle 100 receives a command signal from a mobile phone 300 on the network and the like, via the AP 20. When the command signal is received, the dongle 100 generates a control signal capable of controlling the device E 60 by using the downloaded control program 190, and outputs the generated control signal to the bonded device E 60.

In the example embodiment described above, it can be identified that a function and performance of the dongle 100' may be flexibly strengthened and extended in terms of maintenance after being sold to customers.

Figure 14:
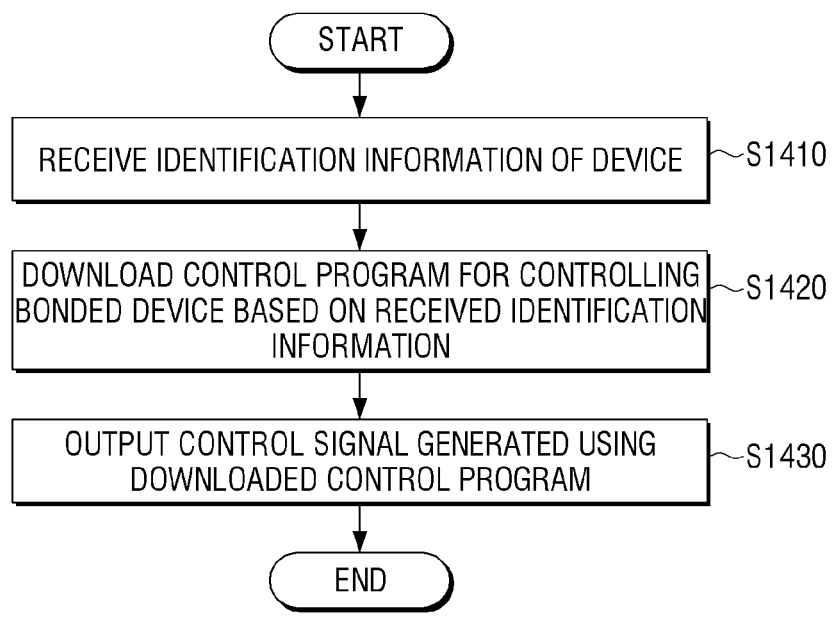
FIG. 14 is a flowchart illustrating a method for controlling a dongle, according to an example embodiment.

FIG. 14 is a flowchart illustrating a method for controlling a dongle, according to an example embodiment.

Referring to FIG. 14, a method for controlling a dongle comprises receiving identification information of a device first, at operation S1410. In detail, the dongle may receive intrinsic identification information of the device from a bonded device. In this regard, the received identification information may be information recorded in the device in ASCII code.

Next, a control program for controlling the bonded device is downloaded based on the received identification information, at operation S1420. In detail, the dongle may download the control program from the server based on the identification information of the device received from the device.

In this regard, the dongle may follow the process of FIG. 8 or FIG. 10 to connect to the AP to access the server on the network. In detail, the method may further include an operation of broadcasting an advertisement signal including identification information and an operation of receiving AP information from an external device connected to the dongle by using the advertisement signal. The dongle having received the AP information may be connected to the AP.

In this regard, the dongle may carry out wireless communication in a Wi-Fi method, and include the received identification information written in ASCII code in the SSID field and broadcast it.

The dongle may request a control program to an address of a server on the network via the connected AP and download the control program. In this regard, the dongle may identify a type of device based on the identification information, and request a program corresponding to the determined device type to the server.

Meanwhile, referring to FIGS. 9 and 10, the dongle may download a control program from a connected external device by using the broadcasted advertisement signal. That is, the dongle may receive a control program that the external device has downloaded from the server.

Next, a control signal generated using the downloaded control program is output, at operation 51430. In detail, the dongle may generate a control signal capable of controlling the bonded device by using the control program and output the generated control signal to the device.

In this regard, the dongle connected on the network may receive a command signal from an external electronic device. The command signal transmitted via the network may comply with a predefined protocol for interlocking multiple devices on the network. In addition, the dongle may convert the received command signal to a control signal capable of being recognized and controlled by the device by using the control program and output it.

The above-described control method has an advantage that a large amount of memory for containing all programs in a dongle is not required and that an adaptive operation according to a bonded device is possible.

Meanwhile, the control method is implemented not only in a dongle 100 of FIGS. 2 and 3, but also in various devices for relaying an external signal and controlling the connected device. In addition, the control method may be stored in various storage media. Accordingly, the methods according to the above-mentioned various exemplary embodiments may be realized in various types of electronic apparatuses to execute a storage medium.

In detail, according to an example embodiment, a non-transitory computer readable medium in which a program sequentially carrying out a step of receiving identification information of a device, a step of downloading a control program for controlling a bonded device, and a step of outputting a control signal generated using the downloaded control program is stored may be provided.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

The invention claimed is:

1. A dongle for relaying communication, comprising:
a first communication interface configured to perform a wireless communication;
a second communication interface configured to physically couple to a device comprising a processor configured to control the device, and to receive identification information of the device, wherein the device does not support a wireless communication, and wherein the dongle is configured to provide a wireless communication capability for the device; and a processor configured to:
broadcast an advertisement signal including the received identification information,
establish a first communication link between the first communication interface and an external device received the advertisement signal,
receive Access Point (AP) information from the external device through the first communication link,
establish a second communication link between the first communication interface and an AP using the received AP information,
access a server though the second communication link,
transmit the received identification information to the server through the second communication link,
receive, from the server, a control program for controlling the device based on the identification information of the device received from the device,
convert a command signal to a control signal for controlling the device using the control program in response to receiving the command signal from the server through the first communication interface,
and output the control signal for controlling the device to the processor of the device through the second communication interface, using the received control program.

2. The dongle as claimed in claim 1, wherein the received command signal is a signal of a command generated according to a predefined protocol for interlocking the device with another device included in a home network.

3. The dongle as claimed in claim 1, wherein the processor is further configured to identify a type of the device based on the received identification information, and to download the control program corresponding to the identified device type from the server through the first communication interface.

4. The dongle as claimed in claim 3, wherein the processor, based on the type of the device not being identified based on the received identification information, transmits the received identification information to the server to search for a control program corresponding to the device, and controls the first communication interface to download a found control program from the server.

5. The dongle as claimed in claim 1, wherein the wireless communication is a Wi-Fi communication,
wherein the identification information of the device is written in an American Standard Code for Information Interchange (ASCII) code, and
wherein the advertisement signal includes a Service Set Identifier (SSID) information corresponding to the received identification information.

6. A method for controlling a dongle for relaying communication, the method comprising:
receiving, from a direct communication interface of the dongle physically connected to a device comprising a processor configured to control the device, identification information of the device, wherein the device does not support a wireless communication function;
broadcasting an advertisement signal including the received identification information through a wireless communication interface of the dongle;
establishing a first communication link between the wireless communication interface of the dongle and an external device received the advertisement signal;
receiving Access Point (AP) information from the external device through the first communication link;
establishing a second communication link between the wireless communication interface of the dongle and an AP using the received AP information;
accessing a server though the second communication link;
transmitting the received identification information to the server;
downloading, from the server through the wireless communication interface of the dongle, a control program for controlling the device based on the received identification information;
converting a command signal to a control signal for controlling the device using the downloaded control program in response to receiving the command signal from the server through the wireless communication interface of the dongle; and
outputting the control signal for controlling the device to the processor of the device through the direct communication interface, using the downloaded control program.

7. The method as claimed in claim 6, wherein the received command signal is a signal of a command generated according to a predefined protocol for interlocking the device with another device included in a home network.

8. The method as claimed in claim 6, further comprising:
identifying a type of the device based on the received identification information; and
downloading, from the server, the control program corresponding to the identified device type.

9. The method as claimed in claim 6,
wherein the received identification information is written in an American Standard Code for Information Interchange (ASCII) code, and
wherein the advertisement signal includes a Service Set Identifier (SSID) information corresponding to the received identification information.

* * * * *